United States Patent [19]
Selby

[11] Patent Number: 5,404,232
[45] Date of Patent: Apr. 4, 1995

[54] CALIBRATION SYSTEM FOR A RASTER INPUT SCANNER

[75] Inventor: Bart D. Selby, Walworth, N.Y.

[73] Assignee: Xerox Corporation, Stamford, Conn.

[21] Appl. No.: 131,161

[22] Filed: Oct. 4, 1993

[51] Int. Cl.⁶ ............................................. H04N 1/46
[52] U.S. Cl. ................................. 358/406; 358/466; 358/464; 358/462
[58] Field of Search ............... 358/504, 406, 466, 475, 358/465, 446, 461, 464, 482, 474; 382/53

[56] References Cited

U.S. PATENT DOCUMENTS

| | | | |
|---|---|---|---|
| 4,757,389 | 7/1988 | Clark | 358/298 |
| 4,806,780 | 2/1989 | Yamamoto | 358/293 |
| 4,850,029 | 7/1989 | Moyer | 358/283 |
| 4,855,943 | 8/1989 | Lewis | 364/575 |
| 4,903,141 | 2/1990 | Morton et al. | 358/448 |
| 4,982,294 | 1/1991 | Morton et al. | 358/465 |
| 5,047,861 | 9/1991 | Houchin et al. | 358/213.15 |
| 5,062,144 | 10/1991 | Murakami | 358/464 |
| 5,185,673 | 2/1993 | Sobol | 358/296 |
| 5,204,761 | 4/1993 | Gusmano | 358/461 |
| 5,282,053 | 1/1994 | Robideau | 358/406 |
| 5,317,421 | 5/1994 | Ito | 358/464 |

Primary Examiner—Edward L. Coles, Sr.
Assistant Examiner—John Ning
Attorney, Agent, or Firm—R. Hutter

[57] ABSTRACT

A photosensor for measuring the reflectivity of a surface is calibrated for consistent gain and offset. The reflectivities of a plurality of regions of a test surface are measured. An average of the measured reflectivities is calculated, and a threshold value related to the average is derived therefrom. A revised average of the measured reflectivities is then calculated, the revised average being an average of measured reflectivities only of regions having reflectivities of a predetermined relationship to the threshold value. Subsequent signals from the photosensor are then revised according to a function related to the revised average.

10 Claims, 3 Drawing Sheets

CALIBRATION SYSTEM FOR A RASTER INPUT SCANNER

The present invention relates to raster input scanners, and more specifically to system for calibrating the gain and offset of image signals output by the scanner.

In a raster input scanner (herein referred to as a "scanner"), a plurality of photosensors, typically in the form of a linear array, are caused to move relative to an image, which is typically on a sheet of paper. As the linear array of photosensors moves across the image, each photosensor outputs a series of signals related to the intensity of reflected light from the small area of the image focused on by a given photosensor at a given moment. These output signals are then sampled and collected, in a manner known in the art, and typically retained as digital image data.

The responsivity of a particular photosensor, and by extension an entire scanner, is the relationship between the intensity of light impinging on the photosensor and the resulting value, typically in the form of a voltage, or a digital "gray-scale" value derived from the voltage, of the output signal. If the responsivity is thought of in terms of a graph in which increasing light intensity forms the x-axis and the output voltage forms the y-axis, the gain of the photosensor is the slope of a linear relationship, while the offset is indicated by the y-axis intercept, thus indicating the voltage output of the photosensor at zero light intensity.

In the practical, day-to-day use of a scanner, the responsivity of each of the photosensors changes over time, and the changes in the system must be compensated for periodically, in order to ensure consistent output from the scanner. Common sources of long-term performance variation over time of a scanner include the declining intensity of the internal lamp in the scanner, and the general fading of test surfaces from their original preset reflectivities. The periodic compensation of the system for changes in responsivity is known as "calibration" of the scanner. The calibration step is typically carried out at the daily power-up of the scanner, and generally comprises the steps of having the photosensors in the array be exposed to two test strips built into the scanner: a black test strip for setting the offset, and a white test strip of a predetermined reflectivity for setting the gain. These test strips are often incorporated into the structure of the scanner, such as adjacent the platen upon which the image to be scanned is placed.

In the usual straightforward calibration system, the test strips are of sufficient width so that each photosensor moving across the strips will be able to measure the reflectivity of a plurality of small, pixel-size regions in each strip. For each of the black strip and the white strip, the calibration system measures reflectivity values for a number of small pixel-size regions and averages the readings in order to "smooth out" any small variations in the reflectivity (either black or white) of a given test strip. However, practical experience has shown that sometimes the mere averaging of a set of pixel-size regions on a test strip is not enough to cancel out the effects of, for example, a small and concentrated patch of dirt on the test strip. When such a discrete source of an anomalous reflectivity, such as a speck of dust or a hair, finds its way onto a test strip, the photosensors affected by the dirt will be "misled" by the anomaly: instead of the averaging process cancelling out many small variations, a large anomaly among samples will so bias the statistics that the measured average will be drawn away from the average reflectivity of most pixels. Dark dirt on a white test strip causes the scanner to set the gain too high in the affected area of the scanned image; similarly, dirt on the black strip causes too much offset to be subtracted from the calibration data, which again causes the gain to be set too high. When the system is thus "misled," a conspicuous streak of light area typically appears on an image created with the image data, corresponding to the position of the dirt on the test strip.

It is one object of the present invention to provide a calibration system for setting the gain and offset of the photosensors in a scanner which will take into account the possible presence of large anomalies in signals from the test strips, and discount these anomalies in obtaining an average reflectivity of a plurality of pixel-size regions in the test strip.

U.S. Pat. No. 4,855,943 discloses a method for "deaveraging" a stream of digital data. An incoming averaged digital data value from the data stream is multiplied by a predetermined amount, and the number of successive prior data values are subtracted from the multiplied average value to yield a current value. The current value is then delayed by a similar number of delay intervals as the number of prior data values to provide a number of separate corresponding prior data values.

U.S. Pat. No. 4,982,294 discloses an apparatus for enhancing scanned microfilm images to remove single pixel noise therefrom. Each one of the predefined group of incoming pixel values is convolved with a corresponding one of a predefined set of coefficients to generate a convolved pixel value. The convolved pixel value is then compared against a threshold to produce a thresholded pixel value indicative of the results of the comparison. There is also provided a noise tracker to produce a noise value that tracks a noise level present in the threshold pixel value. A background tracker produces a background value that tracks a background level present in the incoming pixel values. The background value and the noise value are combined to produce an error signal which are used to set the threshold level for the current pixel value being processed.

U.S. Pat. No. 4,903,141 discloses a scanner for microfilm images. The microfilm image is scanned, and from the image data an image is reproduced onto photosensitive material. By processing the video signal generated by the first or original image, a series of parameters are produced and stored. A second generation image is electronically scanned and the video signal processed to provide a second series of parameters. The first and second series of parameters are compared to provide an adjustment signal.

U.S. Pat. No. 5,047,861 discloses a system for calibrating a scanner, in which calibration data for each pixel under a known illumination conditions is captured, and this data is then applied to a look-up table to produce individual correction values for each pixel.

U.S. Pat. No. 5,185,673 discloses a closed-loop document processing system. A calibration image for a print path is created, and then the calibration image is processed by the document processing system. Then, distortions in the calibration image causes by the processing are measured, and calculation coefficients for offsetting the distortions are calculated.

U.S. Pat. No. 5,204,761 discloses a system for correcting photosite offset and gain in the analog domain prior to conversion of the analog signals to digital signals, to allow the use of maximum dynamic range of the system once the image is converted.

According to the present invention, there is provided a method of calibrating a scanner having a photosensor for measuring the reflectivity of a surface, the photosensor outputting a signal related to an intensity of light directed thereon. The reflectivities of a plurality of regions of a test surface are measured. An average of the measured reflectivities is calculated, and a threshold value related to the average is derived therefrom. A revised average of the measured reflectivities is then calculated, the revised average being an average of measured reflectivities only of regions having reflectivities of a predetermined relationship to the threshold value. Subsequent signals from the photosensor are then revised according to a function related to the revised average.

Figure 4:
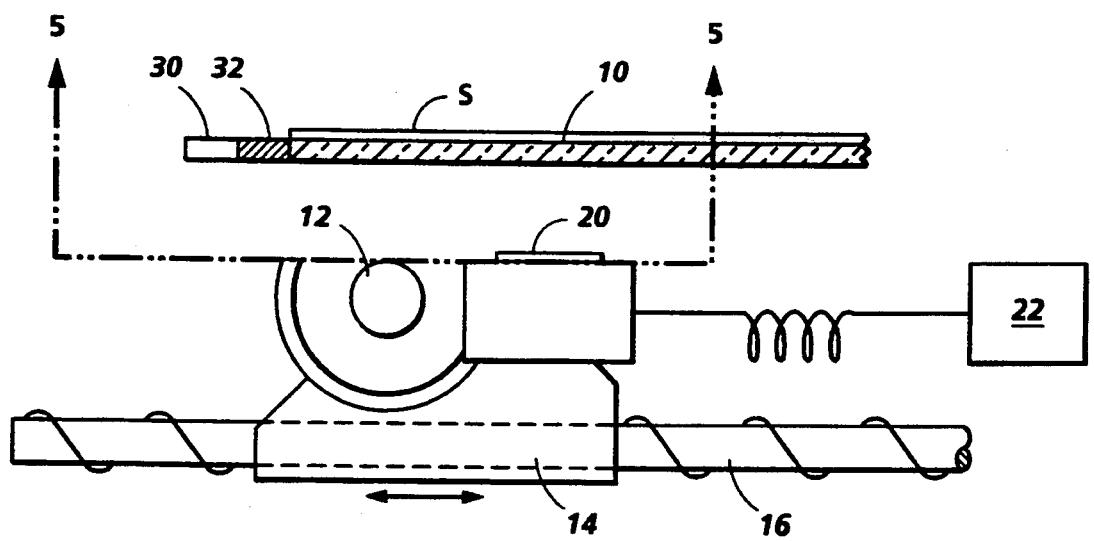
FIG. 4 is an elevational view showing the basic elements of a raster input scanner.

FIG. 4 shows the basic elements of a raster input scanner as would be used with the present invention. An image to be scanned from a sheet S is placed on a transparent platen 10. From the other side of the platen 10, the image is illuminated by a lamp 12 which is conveyed by a reciprocating shuttle 14, which causes the lamp 12 to be moved, or scanned, relative to the sheet S. The shuttle 14 may be caused to move by any number of possible means, such as the rotatable screw 16 shown, or any other arrangement known in the art. Also mounted on shuttle 14 is, in this particular embodiment, a full-width photosensor array 20 which moves with the lamp 12, and which serves to receive the light from lamp 12 which is reflected from the image on sheet S. The array 20 is operatively connected, by serial or parallel means or a combination of such means, to an image processing system here shown schematically and indicated as 22. Image processing system 22 is generally in the form of a computer capable of converting the voltage outputs to a stream of digital gray-scale levels, and performing various arithmetic functions on these gray-scale levels. As part of a control program within image processing system 22 there is provided, according to the present invention, a "calibrator" for performing the method of the present invention on certain data from the array 20. This calibrator includes means for measuring the reflectivities of a plurality of regions of a test surface; means for calculating an average of the measured reflectivities, and deriving a threshold value related to the average; means for calculating a revised average of the measured reflectivities, the revised average being an average of measured reflectivities only of regions having reflectivities of a predetermined relationship to the threshold value; and means for revising a subsequent signal (such as the gain and/or offset thereof) from the photosensor according to a function related to the revised average, all in a manner which will be described in detail below.

Off to one side of the platen 10, but still generally within the path of shuttle 14, is a pair of test strips, a white test strip 30 and a black test strip 32. These test strips are positioned so that, at start-up, the strips may be illuminated by lamp 12 and the light reflecting therefrom may be detected by the photosensors in array 20. The purpose of the white test strip 30 is to permit adjustment of the gain of the system, while the purpose of the black test strip 30 is to allow adjustment of the offset of the system. This calibration of the system is typically initiated automatically by the system either periodically or at start-up when the machine is turned on each day.

Figure 5:
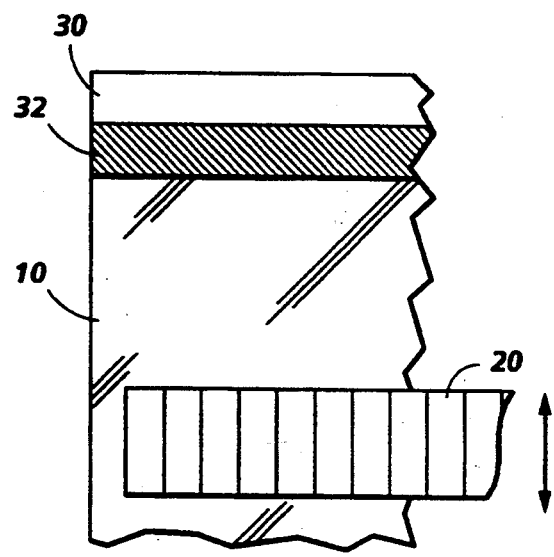
FIG. 5 is a plan view taken along the line 5—5 of FIG. 4 in the direction of the arrows.

FIG. 5 is a simplified view showing in detail the interrelationship between the photosensors in array 20 and the test strips 30, 32. Although not drawn to scale in the Figure, the respective test strips 30, 32 should be so dimensioned that, when the photosensors in array 20 are caused to scan across them, each photosensor in the array should be able to sample approximately 32 pixel-size regions within each test strip. In a typical full-width scanner, the resolution of the individual photosites in array 20 may be from 200 to 400 per inch. In the calibration step, the photosensors in the array are caused to move across each test strip 30, 32, while a plurality of pixel-size regions of each strip along the path of each individual photoreceptor in the array are sampled. Typically, the respective average "white" value (corresponding to the samples taken for each photosensor in the white test strip 30) and average "black" value (corresponding to the sampled regions for each photosensor in the black test strip 32) are merely averaged to obtain predetermined white and black values for the responsivity of the individual photosensor when the individual photosensor is used to scan an image on sheet S.

Figure 1:
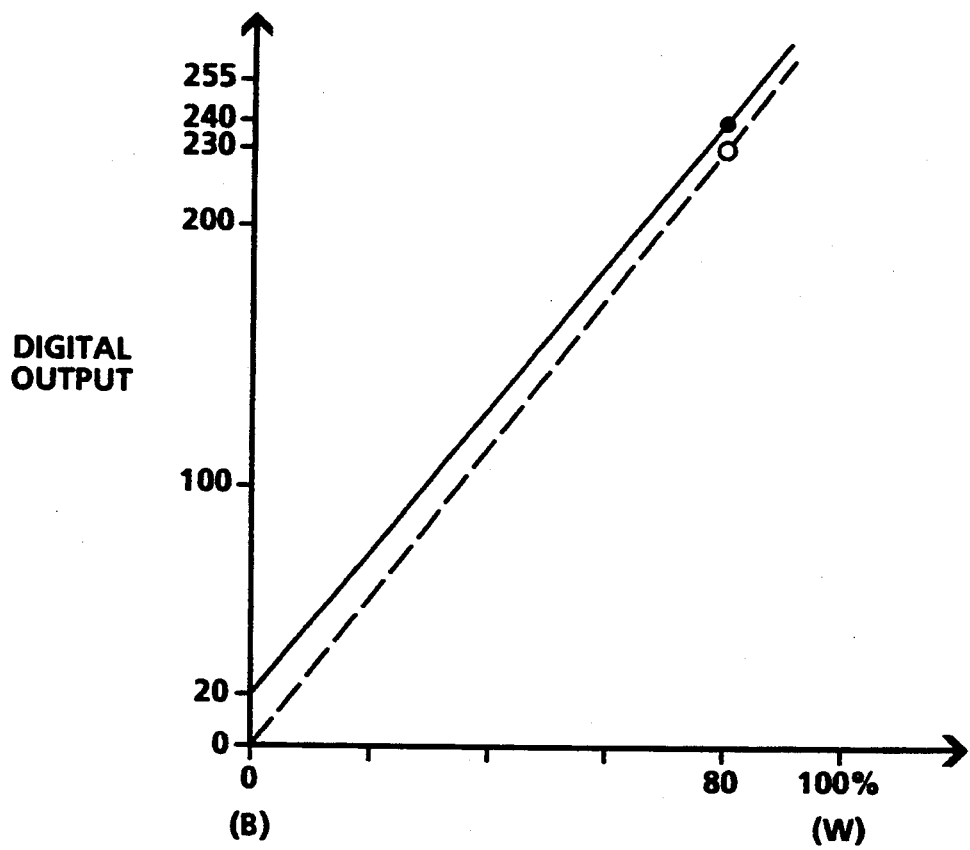
FIG. 1 is a graph illustrating ideal and typical responsivity functions for a photosensor in a scanner, illustrating the calibration principle of the present invention.

FIG. 1 is a graph showing how responsivity correction for a given photosensor in the array 20 is carried out in a typical calibration system, as would be used with the present invention. In the graph, the x-axis represents a range of light intensities from 0%, as would occur when the particular portion of the image is solid black, and a value of 100%, a theoretical value at which the photosensor is entirely saturated by light. Simultaneously, the y-axis represents possible digital outputs of the photosensor from 0 to 255. The typically linear function relating these two scales represents the responsivity of the photosensor; the slope of the relationship is the gain of the system, while the y-intercept represents the offset. A practical scanning system mandates perfect consistency of offset and gain for a large number of pixels and scanned images, regardless of the particular conditions at the time of scanning, or the individual scanner which scanned the image. To this end, a typical system will accept video data from an array of photoreceptors having a predetermined offset and gain. The dashed line in the Figure shows such an "ideal" responsivity. According to the ideal responsivity, the responsivity function should pass through the origin, meaning that if there is no light impinging on the photosensor (as with a black test strip), the output should be 0. Further, in this example, the gain of the photosensor should be such that, at a fixed 80% reflectivity from the given region of the image, the digital output associated with the signal from the photosensor should be 230 on the 0–255 digital scale.

The solid line in the graph represents a typical real-world responsivity of an individual photosensor. Here, the function does not pass through the origin, but shows that there is a signal output of approximately 20 even when no light is supposed to be impinging on the photosensor. Further, the gain (the slope) of the function is not consistent with the ideal gain; thus, the actual function differs from the ideal function both in slope and intercept. In order to adapt the actual output signal from the photosensor, both the gain and offset must be compensated for, when actual image data from a image such as on a sheet S is being recorded. For the particular photosensor shown in the Figure, the offset must be compensated for by subtracting 20 from the raw digital output of the photosensor, and the gain must be corrected by normalizing the actual gain (i.e., adjusting the digital output) by a factor of $230/(240-20) = 1.045$. Such a correction of both the gain and offset may be accomplished individually, through software means known in the art, for each individual photosensor in the array 20.

Figure 2:
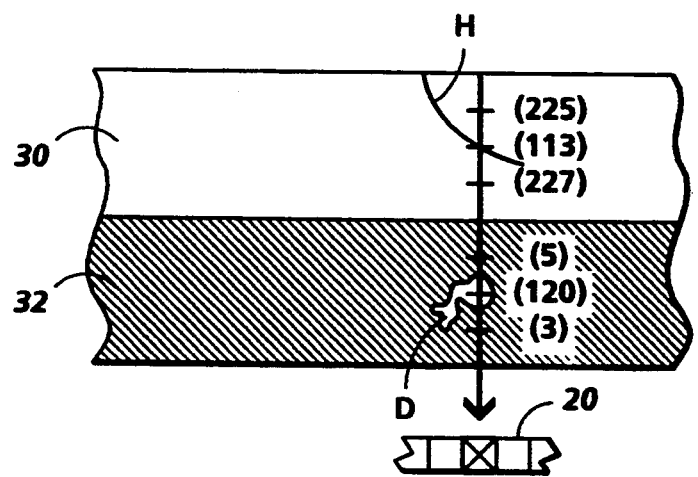
FIG. 2 is an enlarged, fragmentary view showing the interaction of a photosensor with a pair of test strips in a scanner.

FIG. 2 is a detailed view of one photosensor in the array 20 scanning across two test strips 30, 32, and showing a common practical problem which occurs even when a relatively large number of pixel-size regions, typically numbering such as 32 per photosensor per test strip, are averaged. As shown in the detailed view, it is not uncommon that external sources of highly anomalous noise get entrapped on one of the test strips. In FIG. 2 is shown the not uncommon presence of a hair H on the white strip 30, and also some other reflective dust D appearing on the black test strip 32.

Shown across white test strip 30 and black test strip 32 is a path of one particular photosensor in the array 20, and crossing this path are shown typical representative output readings (such as along the y-axis of FIG. 1) at different points along the scan. As can be seen, the readings when the photosensor is moving through the white test strip 30 are usually relatively high, around the 230 range, and the typical readings along the black test strip 32 are very low, in the 5 range. However, when there is certain types of debris along the test strip, such as hair H or dust D, highly anomalous readings result, such as the 113 along test strip 30 and the 120 along test strip 32. In either case, the extreme anomaly of a dark hair on a white test strip or reflective dust on a black test strip will defeat the purpose of averaging a number of measured reflectivities on each test strip by biasing the average value to such an extent that the noise subverts the averaging process and "misleads" the control system.

Figure 3:
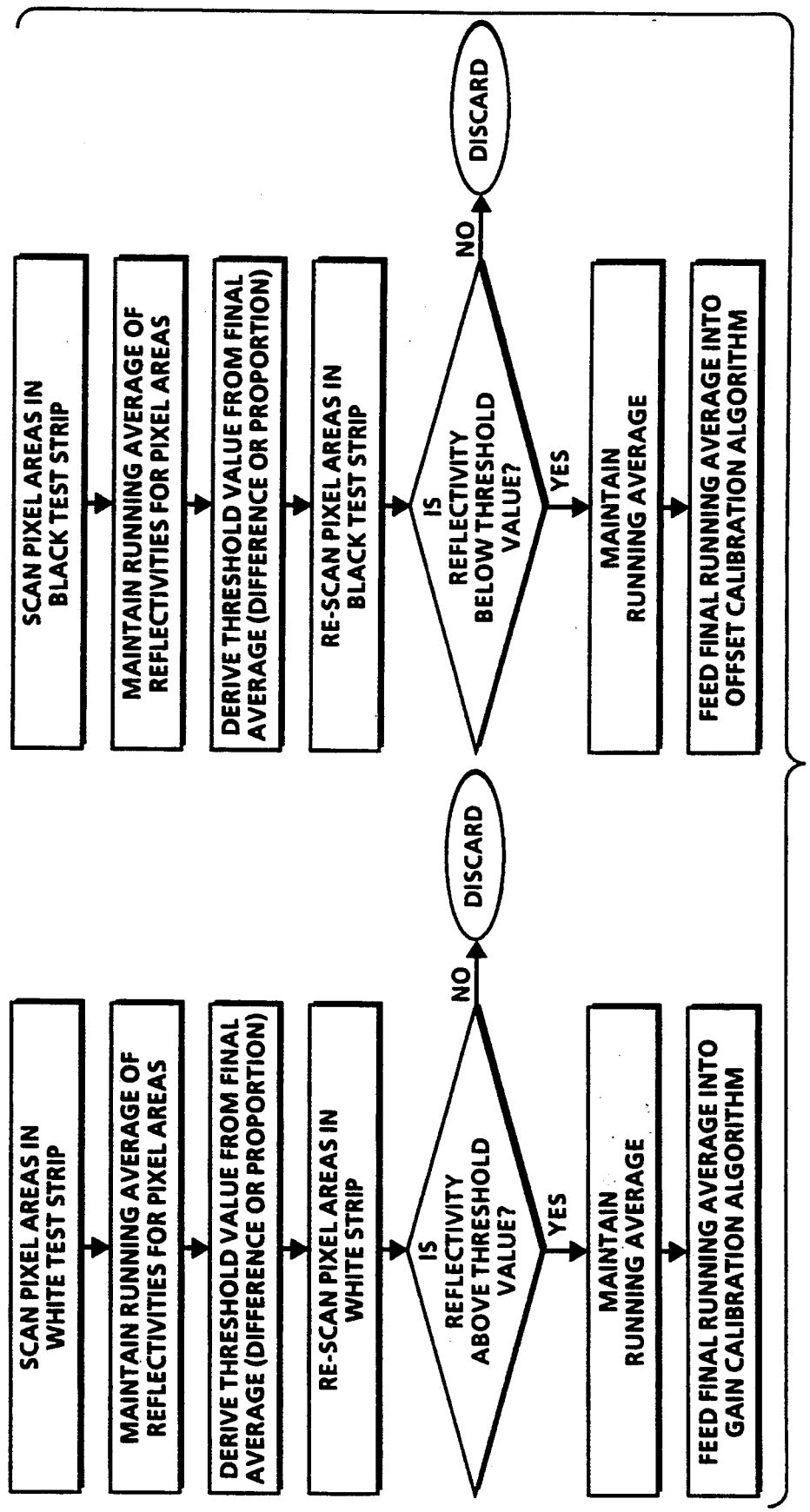
FIG. 3 is a flow-chart describing a method according to the present invention.

The system of the present invention identifies these highly anomalous test strip readings, and discounts them from a calculation of the average reflectivity of each strip. FIG. 3 is a flowchart showing the method of the present invention applied to a calibration step at start-up of a scanner. Although the flowchart is shown in two separate parts, the two parts may be to some extent simultaneous in actual practice. As shown at the top portion of the flowchart, a plurality of pixel areas in the white test strip are scanned by one photosensor, and during the scanning process a running average is maintained of reflectivities across the strip. When the final average is determined, a threshold value is derived from this average. Depending on the particular embodiment of the system, this threshold value could conceivably be equal to the final average, or, in order to provide a more tolerant system, may be of a fixed relationship to the final average, either a fixed proportion of the final average (e.g., 95% of the final average) or a fixed difference from the final average (e.g., the final average minus 5 levels on the 0 to 255 scale).

Once this threshold value is calculated, the pixel areas are re-scanned, and each measured reflectivity value is compared to this threshold value. Returning to FIG. 2, it will be seen that whereas most of the reflectivity values along test strip 30 will be in the 220–230 range, a reading of 113 as would appear along the hair H would be identified by this system as an anomalous value and discarded. Thus, according to the present invention, only the reflectivity values above the threshold values are taken into account and a revised average is maintained. When the revised average is calculated, the divisor is, of course, only the number of reflectivity samples which were actually used and not discarded. This revised average is then used in the gain calibration algorithm.

Similarly, the offset correction analysis for the black test strip 32, shown in the lower portion of FIG. 3, works on the same principle of identifying highly anomalous readings and discarding them. As shown in FIG. 2, the reflectivity of 120 for the reflective dust D would be identified as an anomalous value and discarded. Of course, with the black test strip, the anomalous readings will tend to have particularly high reflectivity levels, and therefore the question becomes whether the reflectivity is below a threshold value. The threshold value for the black test strip may also be of a proportion greater than 1 of the original final average, or a fixed number of gray scale levels may be added to the first average.

Once the revised averages of relectivities for the white test strip and the black test strip are obtained through the method of the present invention, these revised averages are then "fed in" to the correction algorithms for adjusting offset (i.e. adding or subtracting an offset related to the revised average reflectivity of the black test strip) or gain (i.e. mutiplying an actual output from the photosensor by a correction factor related to the revised average reflectivity of the white test strip), much in the manner of the straightforward calibration system of the prior art.

Although the example shown in FIG. 2 discloses the behavior of a single photosensor in the array 20, it will be apparent to one skilled in the art that the system of the present invention can be carried out on every single photosensor in the array 20, or on a specific subset of photosensors in the array 20.

One expedient variation to this system is simply to scan the test strips a single time, and then store the reflectivity values in a temporary memory for obtaining the revised averages, instead of re-scanning.

In summary, the present invention proposes a method whereby the performance variations which are most of interest in calibration of a scanner are emphasized. Such gradual performance variations include those caused by the gradual fading of the test strips with age, or the declining intensity of the illumination lamp with continued use. The present invention discounts, however, such discrete, short-term performance variations such as intense concentrations of dirt at specific points along the test strip. Whereas the long-term gradual performance variations tend to have system-wide effects, the short-term anomalies are specific only to certain individual photosensors and certain specific points along the test strips. The system of the present invention, then, prevents the short-term anomalies from "misleading"

the calibration system, which is intended to detect long-term variations.

While this invention has been described in conjunction with various embodiments, it is evident that many alternatives, modifications, and variations will be apparent to those skilled in the art. Accordingly, it is intended to embrace all such alternatives, modifications, and variations as fall within the spirit and broad scope of the appended claims.

I claim:

1. A method of calibrating a scanner having a photosensor for measuring the reflectivity of a surface, the photosensor adapted to output a signal related to an intensity of light directed thereon, comprising the steps of:
   measuring the reflectivities of a plurality of regions of a test surface;
   calculating an average of the measured reflectivities;
   deriving a threshold value related to the average;
   calculating a revised average of the measured reflectivities, the revised average being an average of measured reflectivities only of regions having reflectivities of a predetermined relationship to the threshold value, and excluding from the revised average measured reflectivities not of the predetermined relationship to the threshold value; and
   revising a subsequent signal from the photosensor according to a function related to the revised average.

2. The method of claim 1, wherein the revising step includes adjusting a gain of the subsequent signal from the photosensor according to a function related to the revised average.

3. The method of claim 1, wherein the revising step includes adjusting an offset of the subsequent signal from the photosensor according to a function related to the revised average.

4. The method of claim 1, wherein the deriving step comprises the step of determining the threshold value as a fixed proportion of the average of the measured reflectivities.

5. The method of claim 1, wherein the deriving step comprises the step of determining the threshold value as a fixed difference from the average of the measured reflectivities.

6. The method of claim 1, wherein:
   the measuring step includes the step of measuring the reflectivities of a plurality of regions of a test surface of a preset reflectivity; and
   the revising step includes adjusting a gain of the subsequent signal from the photosensor according to a function related to the revised average.

7. The method of claim 1, wherein:
   the measuring step includes the step of measuring the reflectivities of a plurality of regions of a test surface intended to reflect no light onto the photosensor; and
   the revising step includes adjusting an offset of the subsequent signal from the photosensor according to a function related to the revised average.

8. The method of claim 1, wherein:
   the measuring step includes the steps of measuring the reflectivities of a plurality of regions of a first test surface of a preset reflectivity and measuring the reflectivities of a plurality of regions of a second test surface intended to reflect substantially no light onto the photosensor; and
   the revising step includes adjusting an offset and a gain of a subsequent signal from the photosensor according to a function related to revised averages for the first test surface and the second test surface.

9. A scanner having a photosensor for measuring the reflectivity of a surface, the photosensor adapted to output a signal related to an intensity of light directed thereon, and further having a calibrator, the calibrator comprising:
   means for measuring the reflectivities of a plurality of regions of a test surface;
   means for calculating an average of the measured reflectivities;
   means for deriving a threshold value related to the average;
   means for calculating a revised average of the measured reflectivities, the revised average being an average of measured reflectivities only of regions having reflectivities of a predetermined relationship to the threshold value, and excluding from the revised average measured reflectivities not of the predetermined relationship to the threshold value; and
   means for revising a subsequent signal from the photosensor according to a function related to the revised average.

10. The scanner of claim 9, further comprising:
    a first test surface of a preset reflectivity; and
    a second test surface intended to reflect substantially no light onto the photosensor, wherein the revising means includes means for adjusting an offset and a gain of a subsequent signal from the photosensor according to a function related to revised averages for the first test surface and the second test surface.

* * * * *